(12) United States Patent
Riley

(10) Patent No.: US 6,502,342 B1
(45) Date of Patent: Jan. 7, 2003

(54) PHOTOGRAPHIC MOUNT

(75) Inventor: Scott T. Riley, Marion, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/458,628

(22) Filed: Dec. 10, 1999

(51) Int. Cl.$^7$ .................................................. A47G 1/06
(52) U.S. Cl. .................................................. 40/705; 40/701
(58) Field of Search .......................... 40/701, 361, 362, 40/630, 299.01, 7.05

(56) References Cited

U.S. PATENT DOCUMENTS

| | | | | |
|---|---|---|---|---|
| 2,291,173 A | * | 7/1942 | Simpson | 40/158 |
| 2,842,883 A | | 7/1958 | Folwell et al. | |
| 3,077,688 A | * | 2/1963 | Friedman et al. | 40/158 |
| 3,235,991 A | * | 2/1966 | Harper et al. | 40/159 |
| 3,242,605 A | | 3/1966 | Kleinschmidt | |
| 3,591,943 A | * | 7/1971 | Green | 40/158 |
| 3,681,866 A | | 8/1972 | Loersch | |
| 3,718,471 A | | 2/1973 | Edwards et al. | |
| 3,814,518 A | * | 6/1974 | Wichers | 355/75 |
| 4,249,328 A | * | 2/1981 | Plumadore | 40/158 B |
| 4,841,652 A | * | 6/1989 | Sakashita et al. | 40/299 |
| 5,234,886 A | * | 8/1993 | Sarrar et al. | 40/159.2 |
| 5,322,723 A | * | 6/1994 | Bickett | 40/361 |
| 5,335,027 A | * | 8/1994 | Lin et al. | 40/159 |
| 5,459,538 A | | 10/1995 | Petry, Jr. et al. | |
| 5,568,210 A | * | 10/1996 | Kiehne et al. | 353/120 |
| 5,622,420 A | * | 4/1997 | Bengtsson | 353/120 |
| 5,905,099 A | * | 5/1999 | Everaerts et al. | 522/126 |

* cited by examiner

Primary Examiner—Lynne A. Browne
Assistant Examiner—Kenn Thompson
(74) Attorney, Agent, or Firm—Susan L. Parulski

(57) ABSTRACT

A photographic mount. The mount includes a base member having a fold line defining a pair of blanks. The base member is made of a support layer and a polymer layer disposed thereon, preferably a low density polyethylene. The base member further includes a pair of spaced apertures which are disposed in overlapping registration when the base member is folded along the fold line. A locating frame is carried by one of the pair of blanks attached to the polymer layer, to form a frame about one of the pair of apertures.

12 Claims, 3 Drawing Sheets

PHOTOGRAPHIC MOUNT

FIELD OF THE INVENTION

The present invention relates generally to photography and more particularly to mounts for photographic positives or transparencies for projection purposes.

BACKGROUND OF THE INVENTION

A photographic positive or transparency (commonly referred to as photographic slides, though hereinafter collectively referred to as a transparency) are customarily prepared from photographic film for projection purposes, and are typically mounted so that they may be readily handled for projection purposes. To make the transparencies useable at relatively low costs, the transparencies are mounted in mounts made of inexpensive material such as cardboard or paper (commonly referred to as board). Mounts generally include a coating on an interior surface to prevent transmission of light during backlighting from projection. Further, much of the actual mounting is done by automatic machinery and at high speeds. While satisfactory results can be obtained with automatic machinery, manufacturing difficulties can occur. For example, the transparencies may not be properly registered within the mount. Further, the mount may not be sufficiently secured to retain the transparency within the mount. In addition, if heat is applied to secure the mount, overheating may adversely affect the transparency being mounted.

U.S. Pat. No. 2,842,883, by Folwell et al., titled, "Paper Mount For Transparencies," Jul. 15, 1958, and U.S. Pat. No. 3,077,688, by Friedman et al., titled, "Photographic Mount," Feb. 19, 1963, and U.S. Pat. No. 3,235,991, by Harper et al., titled, "Paper Mount For Photographic Transparencies," Feb. 22, 1966, disclose mounts for photographic transparencies. While such mounts may have achieved certain degrees of success in their particular applications, the mounts have not provided a readily manufacturable, low cost mount which uses commodity materials wherein a transparency is properly aligned and secured within the mount by automatic means.

A known mount is disclosed in FIG. 1. As illustrated, mount 10 includes a support member 11 including an opacifant layer and having a fold line 12 to define a pair of blanks 14,16. Each blank 14,16 includes an aperture 18,20 which are in overlapping registration when support member 11 is folded along fold line 12. A frame 22 is disposed on one blank 14 to form a frame for locating the transparency. Frame 22 includes at least one layer of adhesive which is heat activated and pressure sensitive. Frame 22 may optionally include a wax coating to provide sealant. Disposed adjacent frame 22 is a coated strip of adhesive 24 for attaching/aligning the transparency to the mount within the frame when the mount is in an unfolded position. Once support member 11 is folded along fold line 12, heat and pressure are applied to the mount to seal frame 22 of blank 14 to blank 16. While this mount 10 may have achieved certain degrees of success in its particular applications, the inclusion of the adhesive strip 24 does not provide for a readily manufacturable, low cost photographic mount which uses commodity materials.

Accordingly, a need continues to exist for a readily manufacturable, low cost mount in which a transparency can be properly aligned and securely positioned within the mount by automatic means without adverse effect to the transparency, and in which non-customized, commodity materials can be employed.

SUMMARY OF THE INVENTION

An object of the present invention is to provide a photographic mount which is readily manufacturable.

Another object of the invention is to provide such a photographic mount which is low in cost to manufacture.

Still another object of the invention is to provide such a photographic mount in which a transparency can be properly aligned and securely positioned within the mount by automatic means and without adverse effects to the transparency.

Yet another object of the invention is to provide such a photographic mount which uses commodity materials.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a photographic mount including a base member elongated in one direction along an axis and having a fold line perpendicular to the axis to define a pair of blanks. The base member is made of a support layer and a polymer layer, preferably polyethylene. The base member further includes a pair of spaced apertures, with one aperture disposed in each of the pair of blanks. When the base member is folded along the fold line, the pair of apertures are disposed in overlapping registration. A locating frame is carried by one blank, attached to the polymer layer, to form a frame about the aperture.

The present invention provides a manufacturable, low cost mount in which a transparency can be properly aligned and securely positioned within the mount by automatic means without adverse effect to the transparency, and in which commodity materials are used.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
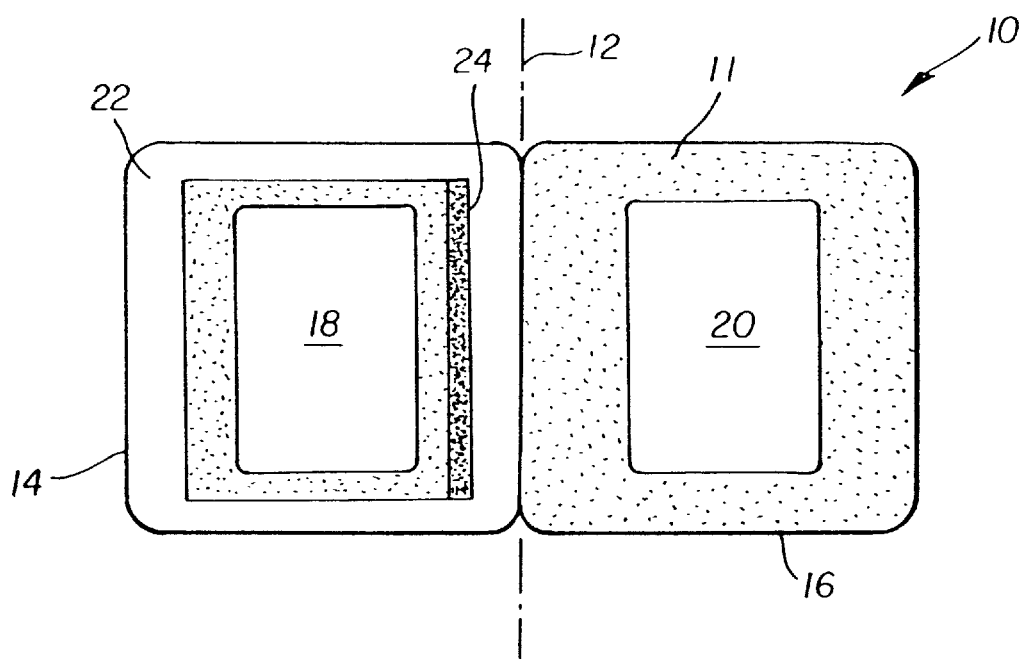
FIG. 1 shows a prior art photographic mount.
Figure 2:
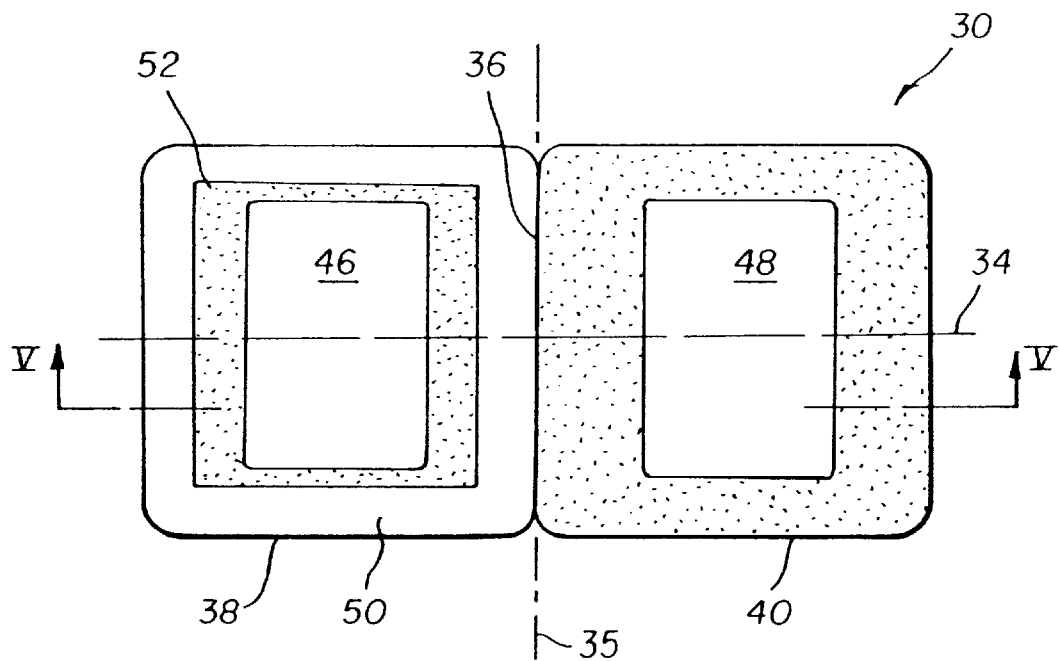
FIG. 2 shows a top view of a photographic mount in accordance with the present invention.

The following is a detailed description of the preferred embodiments of the invention, reference being made to the drawings in which the same reference numerals identify the same elements of structure in each of the several figures.

FIGS. 2 through 6 illustrate a photographic mount 30 in accordance with the present invention which is suitable for mounting a transparency. Mount 30 includes a base member 32 elongated in one direction along an axis 34. Base member 32 includes a fold line 36 disposed along an axis 35 substantially perpendicular to axis 34 to define a pair of blanks 38,40.

Figure 3:
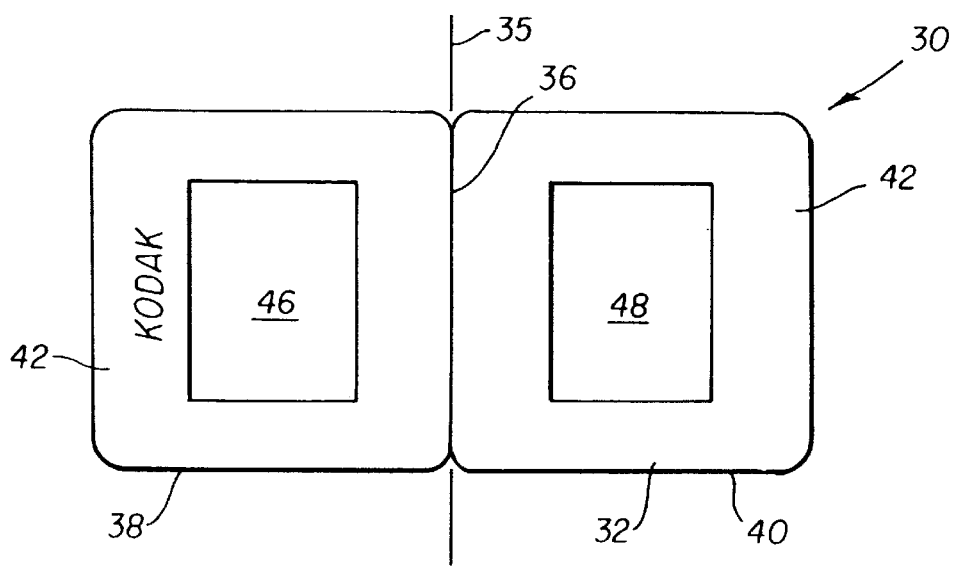
FIG. 3 shows a bottom view of the photographic mount of FIG. 2.
Figure 4:
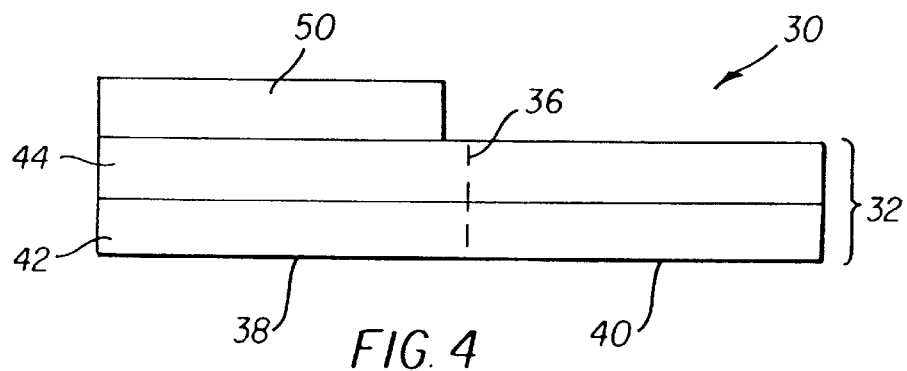
FIG. 4 shows a side view of the photographic mount of FIG. 2.
Figure 5:
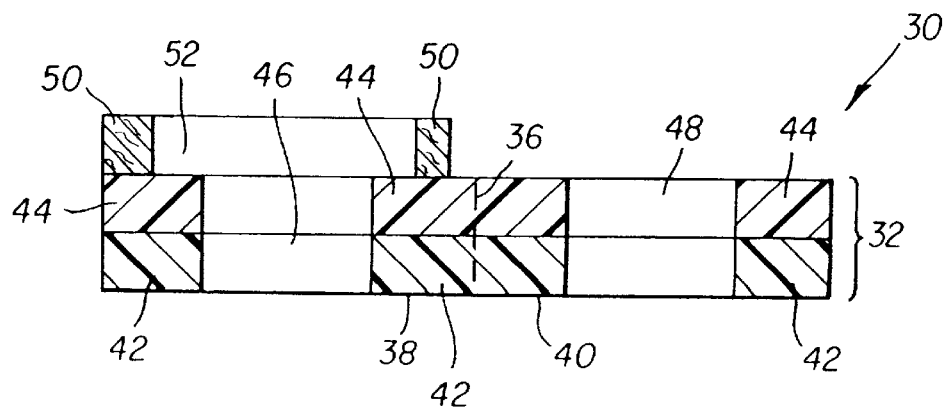
FIG. 5 shows a cross sectional view of the photographic mount of FIG. 2 taken along axis V—V.

Base member 32 is comprised of a support layer 42 and a polymer layer 44 disposed thereon, as best illustrated in FIG. 4. Support layer 42 may be comprised of a sufficiently rigid material to support a transparency such as cardboard, paperboard, metal, or glass. Preferably, support layer 42 is an inexpensive material to provide a reduction in the overall cost of photographic mount 30. In addition, support layer 42 preferably provides an exterior surface on which information can be provided (such as through writing or embossing), as best illustrated in FIG. 3, for example to provide the name ("KODAK") of the manufacturer of the transparency.

A polymer layer 44 (or polymer coating) is disposed on one side of support layer 42 by means known to those skilled in the art, for example, extruded coated. Polymer layer 44 is preferably a polyethylene, and more particularly, a low density polyethylene. A suitable polymer layer 44 has a thickness in the range of 0.0005 to 0.003 inches, is susceptible to a heat range of 325–250 degrees F. for at least a 0.3–0.5 second heat application dwell. Further, polymer layer 44 is preferably stable to 50 degrees C. when mount 30 is positioned within a cooperating operational projector for viewing the transparency. Polymer layer 44 provides a means of securing/holding the transparency during the mounting process, and also provides a permanent sealant for the photographic mount.

Polymer layer 44 may comprise a color. That is, polymer layer 44 can be obtained in several solid colors. The coloring of the polymer layer negates the need for the custom coating on the interior surface of the board that prevents light transmission (i.e., a colored board), and thereby provides for the use of a commodity-produced white board as support layer 42. A colored polymer layer 44 may produce an opacifying effect of at least 2.5 ODU (optical density units).

An aperture 46,48 is disposed in each of the pair of blanks 38,40, respectively. Apertures 46,48 are spaced apart but are disposed in overlapping registration when base member 32 is folded along fold line 36.

A locating frame 50 is carried by one 38 of the pair of blanks to form a frame about one 46 of the pair of apertures to provide a means for correctly locating a transparency (not shown) and permitting the transparency to be more readily inserted. Locating frame 50 is attached to polymer layer 44 of blank 38, and is so configured to define a transparency receiving area 52 on base member 32 for receiving the transparency. Locating frame 50 may be comprised of kraft paper, paper, or paperboard. Preferably, locating frame 50 is a material which does not adversely affect the photographic characteristics of the transparency and is preferably an inexpensive material to provide a reduction in the overall cost of photographic mount 30. Locating frame 50 may be applied to blank 38 by means known to those skilled in the art, for example, by the application of heat.

Figure 6:
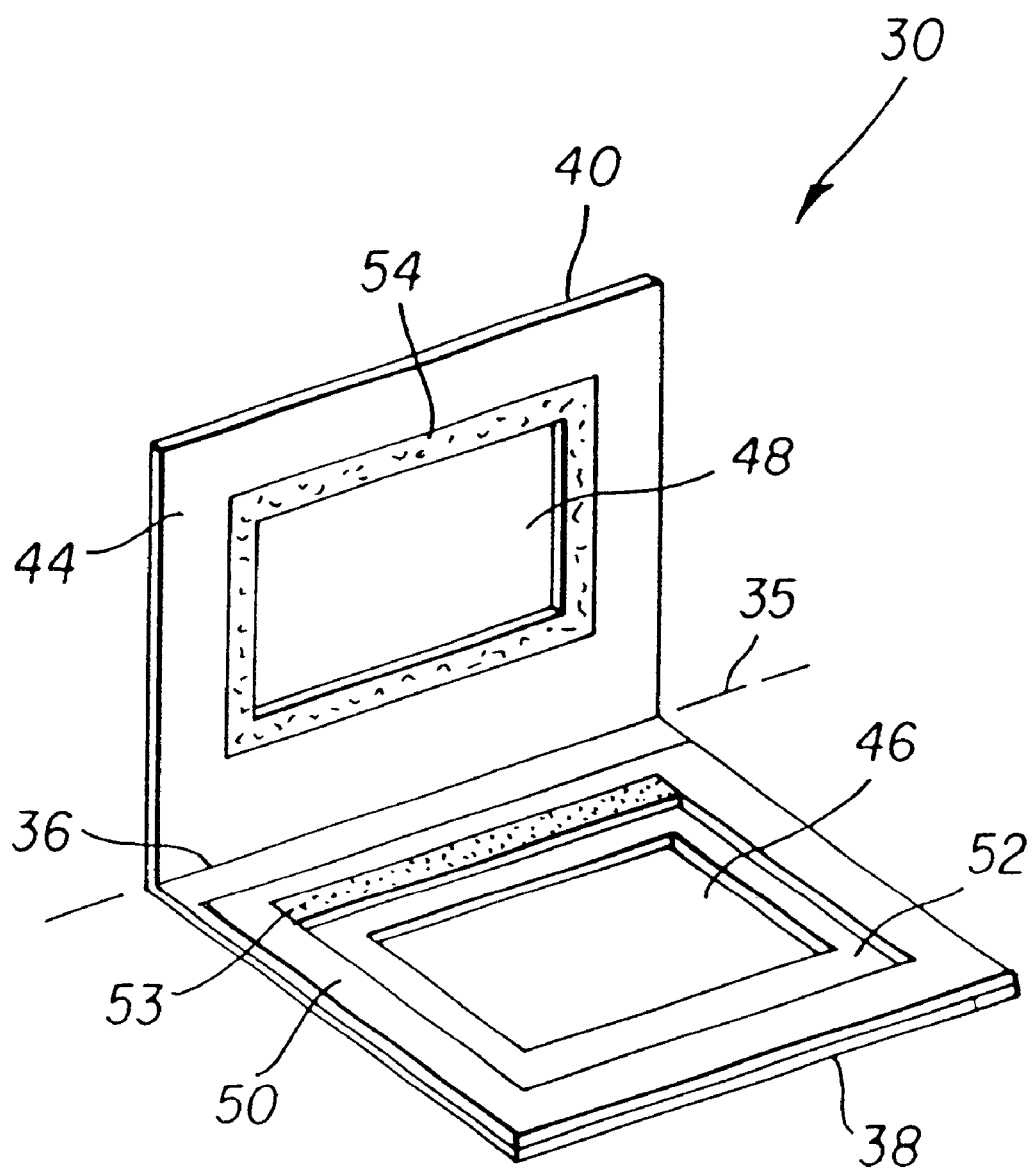
FIG. 6 shows an inside perspective view of the photographic mount of FIG. 2 with the mount partially folded along the fold line.

A coated strip or stripe of adhesive 53 may optionally be disposed on blank 38 within transparency receiving area 52 (preferably adjacent locating frame 50), as best illustrated in FIG. 6. Such a strip of adhesive could provide for the attachment/aligning of the transparency to the mount when the mount is in an unfolded position. Strip of adhesive 53 could be, for example, a solvent based, thinly coated adhesive.

Blank 40 preferably includes a raised or embossed area 54 disposed about aperture 48, as illustrated in FIG. 6. Embossed area 54 is configured to correspond with transparency receiving area 52, such that when base member 32 is folded along fold line 36 and blanks 38,40 overlap, embossed area 54 overlaps and is disposed within transparency receiving area 52 so as to secure the transparency in a substantially flat arrangement within transparency receiving area 52.

To position the transparency within mount 30, the transparency is disposed within transparency receiving area 52 defined by locating frame 50. Base member 32 is folded along fold line 36, as best illustrated in FIG. 6, whereby apertures 46,48 are in overlapping registration. As such, when support member 11 is folded along fold ling 36, polymer layer 44 disposed on blank 40 abuts locating frame 50 disposed on blank 38. Heat is applied to mount 30 by means known to those skilled in the art. Polymer layer 44 is activated by the applied heat to thereby form a bond between locating frame 50 and polymer layer 44 disposed on blank 40, thereby sealing blank 38 to blank 40. Since polymer layer 44 is disposed directly on support layer 42, heat transmitted directly through support layer 42 by a suitable heating element will seal the mount together.

Photographic mounts are typically stacked together in a shipping carton with a series of mounts stacked next to the other. The adhesive layer of the prior art mounts is sometimes tacky, and therefore, causes product loss due to the mounts becoming stuck together. In contrast, in the present invention, polymer layer 44 is generally not tacky in ambient temperature, and therefore, the mounts generally do not stick together.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

| PARTS LIST | |
|---|---|
| 10 | mount |
| 11 | support member |
| 12 | foldline |
| 14, 16 | blank |
| 18, 20 | aperture |
| 22 | frame |
| 24 | adhesive strip |
| 30 | photographic mount |
| 32 | base member |
| 34 | axis |
| 35 | axis |
| 36 | fold line |
| 38, 40 | blanks |
| 42 | support layer |
| 44 | polymer layer |
| 46, 48 | apertures |
| 50 | locating frame |
| 52 | transparency receiving area |
| 53 | adhesive strip |
| 54 | embossed area |

What is claimed is:
1. A mount for a transparency, comprising:
   a base member elongated in one direction along an axis, the base member having a fold line perpendicular to the axis to define a pair of blanks, the base member comprised of a support layer having a heat activatable polymer layer disposed thereon, the polymer layer producing an opacifying effect of about 2.5 optical density units;

an aperture disposed in each of the pair of blanks, the apertures disposed in overlapping registration when the base member is folded along the fold line; and a frame adapted to locate the transparency, the frame disposed on and affixed to one of the pair of blanks adjacent the polymer layer, the frame framing the one of the pair of blanks, the base member being foldable along the fold line wherein the frame abuts the polymer layer disposed on the other of the pair of blanks.

2. The mount according to claim 1 wherein the polymer layer is comprised of polyethylene.

3. The mount according to claim 2 wherein the polymer layer is comprised of a low density polyethylene.

4. The mount according to claim 3 wherein the polymer layer is a low density polyethylene having a thickness in the range of about 0.0005 to about 0.003 inches.

5. The mount according to claim 1 wherein the polymer layer forms a seal with the frame when the base member is folded along the fold line and the mount is heated.

6. The mount according to claim 1 further comprising a strip of adhesive disposed on one of the pair of blanks adjacent the frame.

7. A photographic mount, comprising:

a base member elongated in one direction along an axis, the base member having a fold line perpendicular to the axis to define a pair of blanks, the base member comprised of a support layer and a heat activatable polymer layer, the polymer layer producing an opacifying effect of about 2.5 optical density units;

pair of spaced aperture, one of the pair of apertures disposed in each of the pair of blanks, the pair of apertures disposed in overlapping registration when the base member is folded along the fold line; and a locating frame carried by one of the pair of blanks to form a frame about one of the pair of apertures, the frame being attached to the polymer layer.

8. The mount according to claim 7 wherein the polymer layer is comprised of polyethylene.

9. The mount according to claim 8 wherein the polymer layer is comprised of a low density polyethylene.

10. The mount according to claim 9 wherein the polymer layer is a low density polyethylene having a thickness in the range of about 0.0005 to about 0.003 inches.

11. The mount according to claim 7 wherein the polymer layer forms a seal with the locating frame when the base member is folded along the fold line and the mount is heated.

12. The mount according to claim 7 further comprising a strip of adhesive disposed on one of the pair of blanks inboard of the locating frame.

* * * * *